PROCESS AND ARRANGEMENT FOR THE TRANSMISSION OF CALLS
Filed Oct. 3, 1946 3 Sheets-Sheet 1
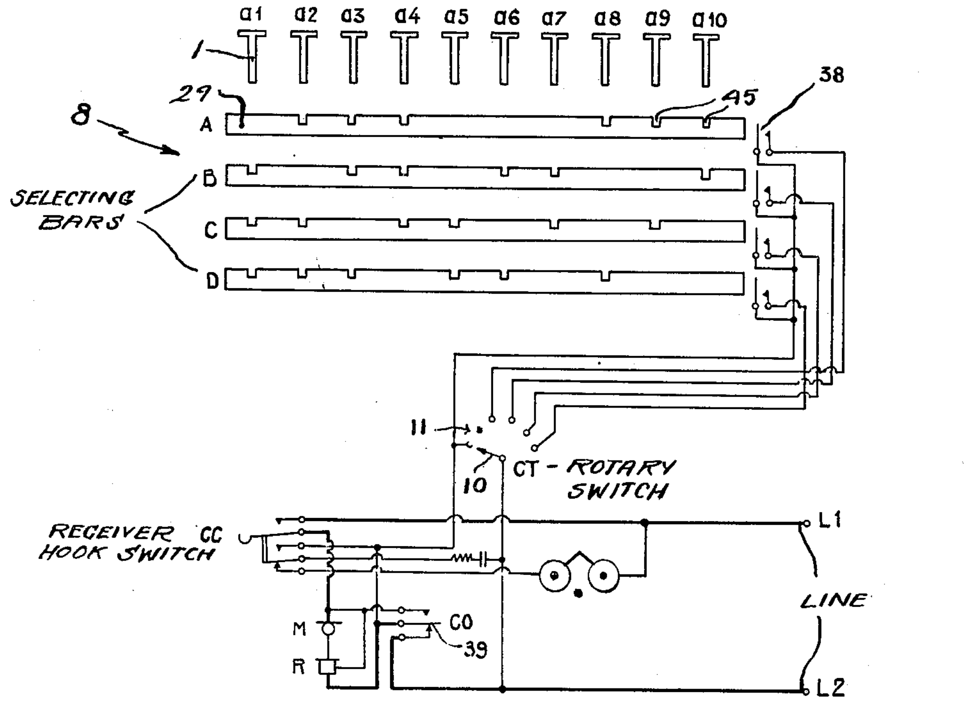
Fig. 1
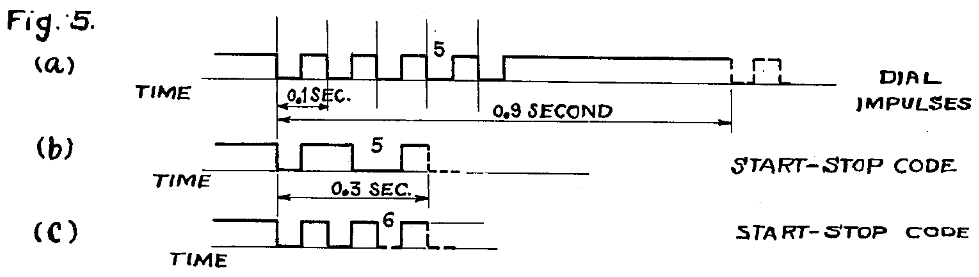
Fig. 5.
| NUMBERS | BARS |
|---|---|
| 1 | A |
| 2 | B |
| 3 | C |
| 4 | D |
| 5 | A - B |
| 6 | A - C |
| 7 | A - D |
| 8 | B - C |
| 9 | B - D |
| 0 | C - D |
Fig. 6
INVENTOR
HENRI LOUIS LESIGNE
By Adams & Bush
ATTORNEYS Dec. 9, 1952 H. L. LESIGNE 2,621,242

PROCESS AND ARRANGEMENT FOR THE TRANSMISSION OF CALLS

Filed Oct. 3, 1946 3 Sheets-Sheet 2

INVENTOR
HENRI LOUIS LESIGNE
By Adams & Bush
ATTORNEYS

Dec. 9, 1952 H. L. LESIGNE 2,621,242

PROCESS AND ARRANGEMENT FOR THE TRANSMISSION OF CALLS

Filed Oct. 3, 1946 3 Sheets-Sheet 3

INVENTOR
HENRI LOUIS LESIGNE
By Adams + Bush
ATTORNEYS

Patented Dec. 9, 1952

2,621,242

UNITED STATES PATENT OFFICE 2,621,242

PROCESS AND ARRANGEMENT FOR THE TRANSMISSION OF CALLS

Henri Louis Lesigne, Vanves, France, assignor to Compagnie Generale d'Electricite, Paris, France, a corporation of France Application October 3, 1946, Serial No. 700,884
In France July 5, 1945

Section 1, Public Law 690, August 8, 1946
Patent expires July 5, 1965

4 Claims. (Cl. 177—380)

The present invention relates to a telecommunication keyboard code transmitter for the transmission of coded signal calls in installations such as systems for remote control, telecommunication, despatching and analogous purposes; it is applicable in particular to the dialing or numbering operation in automatic telephone systems.

Known systems of this kind generally employ, for the transmission of calls and of the number selecting signals by means of pulses, a transmitting device called a dial, which, under the control of the calling subscriber, produces in an electric circuit a number of current interruptions equal to the number of units contained in the digit which it is desired to transmit. The time taken to transmit a digit consequently depends upon the digit.

The object of the system according to the present invention is to provide for the transmission of any one of the ten digits in a uniform length of time, this transmission time being less than what would be necessary with dialing arrangements of the usual known type, and for that purpose employs a code which may be the "start-stop" code instead of simple a succession of dots equal in number to the digits.

The arrangement of the present invention consists in splitting up the fixed period of time assigned to each digit into a certain number of partial periods, one or more of these partial periods being employed for an operating control such as the opening or closing of a circuit, and the other partial periods being employed for the numbering or dialing operation itself. In order to perform the numbering operation, each partial numbering period corresponds to the opening or closing of a circuit, generally the subscriber's line circuit, and the succession of the openings or closings of the circuit at the different partial periods is in accordance with an arrangement which constitutes the numbering code employed.

The interval of time assigned to the transmission of one digit may, for example, be split up into six partial intervals, the two terminal intervals being each employed for the transmission of an operating control signal, and the four other intervals being assigned for the selection or numbering proper. Each digit will then be characterized by the succession of the states of opening or closing of the subscriber's line circuit according to these four partial periods. Thus one may decide, for example, that the digit 4 will correspond to the opening of the circuit during the four partial periods, and that the digit 7 will correspond to the opening of the circuit during the first partial period, and to its closing during the second partial period, and to its opening during the third and fourth partial periods.

Such an arrangement allows of substantially reducing the time necessary for the transmission of the dialing or numbering signals.

The subscriber's dial at the calling station as generally used in known systems permits the production of ten pulses per second, each complete pulse corresponding with the opening and closing of a circuit therefore lasts 0.1 second, and the transmission of the digit 5, for example, of which the duration may be considered to be an average, therefore requires 0.5 second, plus a minimum dead time of 0.4 second for the separation of successive trains of pulses which, in all, amounts to 0.9 second.

In the system according to the present invention, the duration of one partial time interval which corresponds with either the opening or the closing of the circuit, instead of corresponding as in the case of the usual dial pulses, with one opening and one closing, may, therefore, be taken to be equal to 0.05 second, under the same conditions of transmission. If a total time interval be employed comprising six partial intervals, it will be seen that the duration of transmission of one digit will be reduced to 0.3 second instead of 0.9 second, as provided by the ordinary dial.

The present invention, likewise, comprises an arrangement for carrying into effect the previously mentioned procedure, which apparatus is characterized in that it comprises a control keyboard having as many keys as there are different signals or digits to be transmitted, and a rotary switch in series with the subscriber's line and comprising as many contact points as there are partial time intervals employed for the transmission. With this arrangement, the depression of any one key results, on the one hand, in the rotation of the rotary switch, the brush of which comes into contact during each partial time interval with each of its successive contact points, and on the other hand, results in establishing between the appropriate contact point of that rotary switch, electrical connections such that its rotation brings about openings or closings of the subscriber's line circuit which represent, according to the code employed, the digit or signal corresponding to the key depressed.

The accompanying drawings show the application of the present invention to a call transmitting and numbering and dialing arrangement for an automatic telephone system comprising a keyboard with ten keys, and employing six partial time intervals for the transmission of each digit.

In the drawings:

Fig. 1 is a circuit diagram of the system;

Fig. 5 is a time diagram representing successive impulses which represent particular digits in regular dial code and in start-stop code; and Fig. 6 is a table showing which contact selecting bars are actuated to form each digit in the start-stop code.

Referring to Fig. 1, $a_1$ to $a_{10}$ represent the contacts controlled by the ten keys of the keyboard, each contact being carried on an individual key spindle. $L_1$ and $L_2$ are the two line wires of the subscriber between which are connected the microphone M and the receiver R of the subscribers station, through the subscribers receiver hook switch CC and the switch or contact Co. The contact Co is a two-position switch having an arm 39 and is controlled by a mechanical device (not shown), such as a rod, bar, or lever, by the depression of any one of the keys. Such mechanical device extends between the buttons or contacts $a_1$ to $a_{10}$ and contact element Co, the depression of a button causing the bringing of the arm of contact element or switch Co into engagement with its upper contact.

In Fig. 1, the subscribers station includes the microphone M and the receiver R, the switch hook CC, the two-position switch Co, the subscribers bell S, and other elements directly connected to the line wires $L_1$ and $L_2$, and the two wires leading upwardly from one of the contacts of hook switch CC to the first contact point of rotary switch CT, and from line wire $L_2$ to the brush of rotary switch CT.

Figure 3:
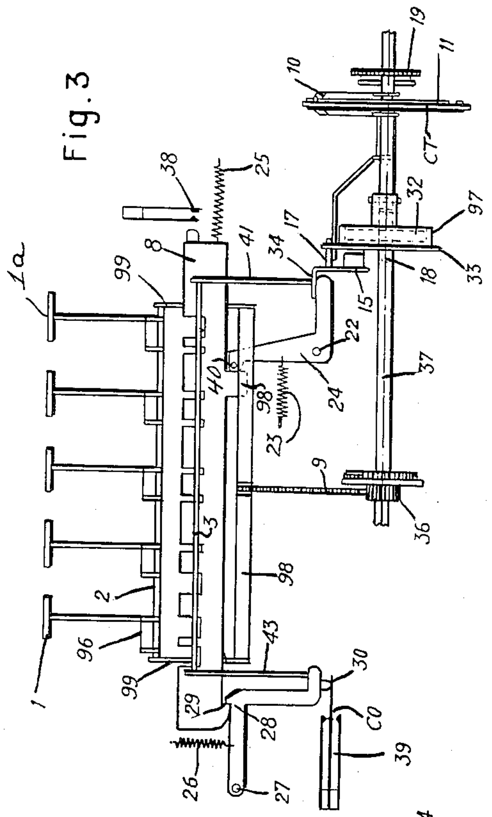
Fig. 3 is a front elevation of the apparatus of Fig. 2.
Figure 2:
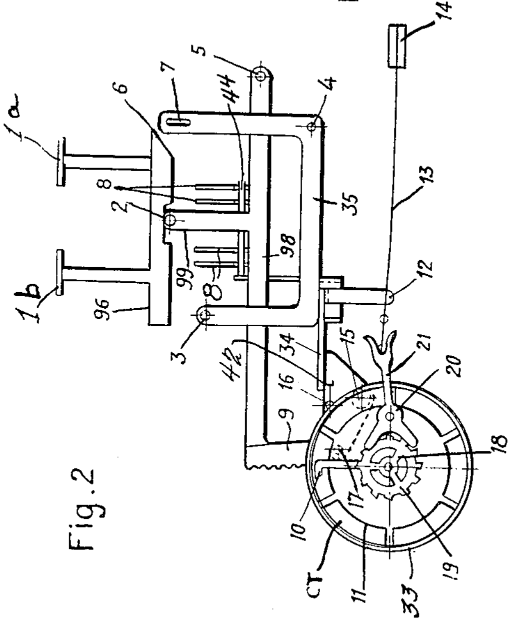
Fig. 2 is a side elevation of the keyboard and controlled dialing impulse producing mechanism.
Figure 7:
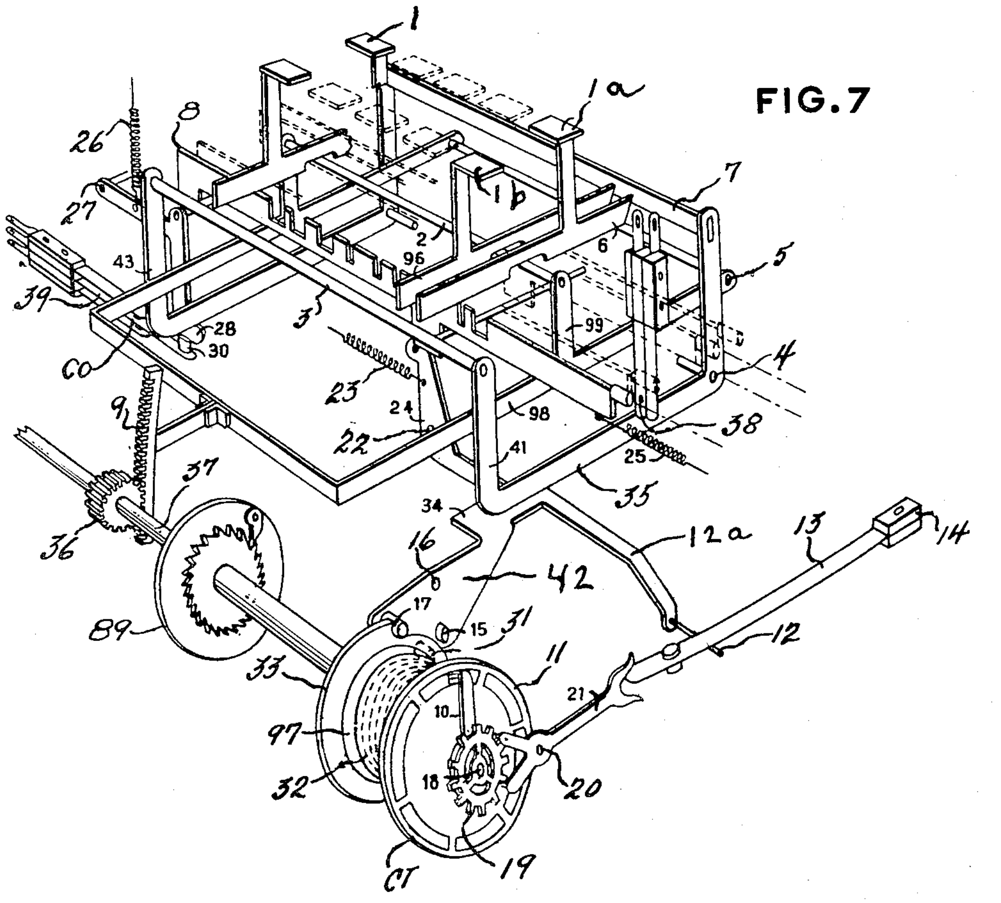
Fig. 7 is an isometric view of the keyboard and controlled dialing impulse producing mechanism which is shown in elevation in Figs. 2 and 3.

The button encoding device for transmitting in a special code the number of a called subscriber, comprises the buttons or contacts $a_1$ to $a_{10}$, the four bars 8 (A, B, C, D), the four bar switches 38, the rotary switch CT, and the various levers, escapements, wheels and other mechanical elements shown in Figs. 2 and 3.

The rotary switch CT is rotatable into any one of six positions, and its mechanical structure will be described in detail hereinafter. The bell of the subscribers station is shown at S.

The drawing shows the various mechanical elements in their stationary position when the device is at rest.

To make a call, the calling subscriber moves his receiver from the switch hook. The subscribers hook switch CC completes the circuit through the line wire $L_1$, the hook switch CC, receiver R, microphone M, contact switch Co, and line wire $L_2$.

To transmit a desired number, the calling subscriber depresses the key corresponding to the desired digit, which operates a corresponding contact, as $a_5$.

The contact switch Co is then actuated, and the circuit is completed through line wire $L_1$, hook switch CC, contact switch Co, rotary switch CT, and line wire $L_2$. The contact Co is controlled by any one of the bars 29 of the key.

The rotary switch CT, which was stationary at position 1, is actuated by means of a mechanical device which will be described hereinafter, and rotates at a speed such that its brush comes into contact during each partial time interval successively with each one of its six contact points or sectors. This speed, in the previously mentioned example, will be 0.05 second for each step or sector.

At position 2 of rotary switch CT, the circuit will always be open, because contact 2 of rotary switch CT is not connected.

At positions 3, 4, 5, 6 of rotary switch CT, the circuit is either open or closed, according to which key is depressed, and the signal arrangement of the particular code employed. Thus, in the case shown in Fig. 1, it will be seen that for the digit 4, for example, the circuit is open at positions 2, 3, 4, 5 and is closed at position 6, while for the digit 7, it is open at positions 2, 4, 5 of rotary switch CT, and is closed at positions 3 and 6. Finally, the brushes return to position 1 of rotary switch CT, where the circuit is always closed.

At the end of the dialing operation, of dialing this digit, the contacts Co assume their original position and the station is ready to transmit a new digit, or to be used for talking.

Figure 4:
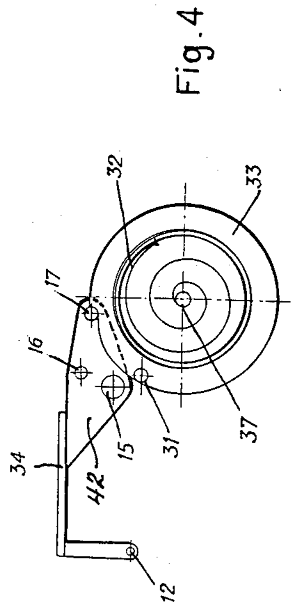
Fig. 4 is a detail of the spring drum and pawl latch control for driving the shaft of a rotary switch.

Figs. 2, 3, 4, represent a mechanical embodiment of the arrangement of Fig. 1.

In the example here considered, the code combinations corresponding to a given digit are obtained by means of as many selection bars 8 as there are partial time intervals employed to define a given digit. These bars can slide laterally, thereby closing one or more contacts, the combination closed being characteristic of the particular digit to be transmitted. These bars comprise a certain number of grooves or slots arranged for the respective bars in accordance with the code adopted, in such manner that the depression of one key can only produce the closing of the various contacts according to the combination representing the digit corresponding to the key depressed.

This arrangement operates as follows:

In Fig. 3, one of the keys of the keyboard is shown at 1 and others keys at 1*a*, 1*b*.

When this key 1 is depressed, a rack 9 is pushed down by a bar 2 and rotates about a pivot 5. The rack 9 drives, in its turn, a pinion 36 fixedly carried by a shaft 37, which, in its rotation applies tension to a spiral spring 32 mounted in a drum 33.

When the key 1 reaches the end of its travel, it actuates a bar 3 which causes a frame part 35 to pivot about a pivot 4.

This causes a locking bar 7 to be moved over the lug 6, of the spindle of key 1, and keep the key 1 depressed; at the same time, the bar 7 passes below the lugs of the other keys and locks them in their raised, undepressed position, thus preventing them from being depressed.

At the same time, the frame part 35 pushes down a part 28 having a detent, which part 28 rotates about a spindle 27 and releases the four selection bars 8, whose shoulders 29 engage the detent on part 28, and these bars 8 are drawn to the right by springs 25. Each of the bars 8 has individual arrangements of slots in register with each of the keys.

If their slots or grooves are appropriately located as to the key positions, these bars 8 are not held back by the depressed key and may move to the right to close one or more contacts, such as 38, in such manner as to set up a combination of pulses characteristic of the digit corresponding to the key depressed.

At the same time, the bell crank lever 34 swings about the pivot 16; in this movement the catch 12 is freed and liberates the vibrating blade 13 which is fixedly mounted at one of its ends 14, and which at its other end drives a forked escapement pawl lever 21 movable about a pivot 20.

In the same manner, a catch 17 becomes free from the notch of the drum 33, which is thus liberated, and rotates under the action of the spring 32 which was placed under tension at the start of the movement.

The drum 33 drives a shaft 18, and the rotary movement of this shaft 18 is controlled at constant speed by the escapement device constituted of the ratchet wheel 19 and the pawl 21.

The brushes 10 of the rotary switch CT are fixed to the shaft 18; during the course of the rotation of these brushes they come successively into contact with the various sectors of the fixed sectored contact plate 11.

When the drum 33 has completed one complete rotation, that is to say, when the six pulses corresponding to one digit have been transmitted, a catch 31 (Fig. 4) carried on the drum 33, pushes the catch 15, which returns the part 34 into the normal position.

This latter part 34 stops the rotation of the drum 33 by means of the catch 17; the vibrating blade 13 is blocked by the catch 12, and, finally, the frame part 35 again resumes its initial position.

The locking bar 7 is then displaced and frees the key 1 which has been depressed and prepares the apparatus for the depression of another key. The bell crank lever part 28 rises under the action of the spring 26 and by its detent, hooks the four selection bars 8 which the bell crank lever 24, whose locked end has been released, while pivoting about the pivot 22 under the action of the spring 23, has brought back to the normal rest position.

The heads 29 of the selection bars and their controlled contacts 38 connected to the rotary switch CT, are shown in Fig. 1.

Fig. 5 shows three time diagrams indicating the duration of the transmission of the digit 5. At (*a*) there are shown the successive spaced pulses according to ordinary dial code, consisting simply of successive equally spaced dots, equal in number to the digit.

At (*b*) there are shown the pulses representing the digit 5 in start-stop code. At (*c*) there are shown the pulses representing the digit 6 in start-stop code. Fig. 5 thus shows that the total time for the transmission of a digit is the same, regardless of which one of the digits is concerned.

Fig. 6 shows a complete schedule for start-stop code, of which ones of the bars are depressed to represent each of the ten digits.

When the key 1 is depressed, representing a particular digit as 1, the bar A slides toward the right, the bars B, C, D are blocked by the engagement of their respective slots, while the bar 2 slides toward the right to close its contact 38 and its switch Co; the operation is similar for the digits 2, 3, 4 which permit their bars B, C, D to be displaced toward the right to close their contact 38 and switch Co. For the digit 5, the bars A and B only can slide toward the right, while bars C and D are blocked by their slots, likewise, the digit 7 displaces bars A, D, and blocks bars B, C. The digit 8 displaces bars B, C, and blocks bars A, D. The digit 9 displaces bars B, D, and blocks bars A, C. The digit 0 displaces bars C, D, and blocks bars A, B.

In the cases in which two of the bars are displaced toward the right, two of the contacts 38 are closed and the contact brushes 10 of the rotary switch CT establish the loop through sectors 11, respectively, during an interval of one-sixth of a turn. For example, for the digit 5, shown in the drawings, since contact point 2 is not connected, and the contact points 3 and 4 are connected to the contacts 38 of the bars A and B, the circuit is closed during the corresponding intervals and is open during the two intervals which follow since the contacts 38 of the blocked bars C and D are open.

For the digit 6, the contacts 38 of the bars A and C are closed, and the contacts 38 of the bars B, D are open, hence the circuit is open at position 2 which has no connection, is closed at position 3, open at position 4, closed at position 5, open at position 6. These arrangements are apparent from the table of Fig. 6.

It will be apparent to those skilled in the art that my invention is susceptible of modifications to adapt the same to particular conditions, and all such modifications which are within the scope of the appended claims I consider to be comprehended within the spirit of my invention.

What I claim is:

1. In a keyboard code pulse transmitter for transmitting coded signals, a plurality of selecting bars each provided with a plurality of differently arranged spaced slots, means for slidably mounting said selecting bars substantially parallel and horizontal, first resilient means normally urging said selecting bars in one horizontal direction, detent means carried by each of said selecting bars, displaceable locking means adapted to normally engage said detent means and hold said selecting bars in a normal position against the action of said first resilient means, a plurality of key spindles, individual slot engaging means carried by each said key spindle, said key spindles and the normal positions of said selecting bars being so arranged that said slot engaging means of the said spindles are respectively engageable in the slots of said selecting bars positioned in register with each said spindle in the normal position of said selecting bars, a rotatable shaft, a rotary switch arm carried by said shaft, a plurality of equal contact sectors selectively engageable with said switch arm, mechanical drive means positively driven by the depression of any one of said key spindles and adapted to cause one complete rotation of said shaft in one direction, second resilient means normally urging said shaft to rotate in the opposite direction, means to release said locking means from engagement with said detent means after the full depression of a said key spindle, an individual bar switch for each said selecting bar and actuatable into closed position thereby when said bars are displaced by said first resilient means, individual connections between a first point of each said bar switch and an individual sector of said rotary switch, a line switch, control means actuatable by the depression of any said spindle for closing said line switch, the initial common sector of said rotary switch isolated from said previously mentioned sectors being connected to the second points of said bar switches and to a point of said line switch, the slots in said selecting bars being arranged according to a determined code to cause transmission of a coded pulse sequence corresponding to a given key spindle upon the rotation of said shaft upon the depression of said key spindle, and master release means actuatable by the completion of one complete rotation by said rotary switch for restoring said selecting bars to their initial normal position and locking them in said initial normal position by said locking means.

2. A transmitter according to claim 1, and an escapement mechanism carried by said shaft for maintaining constant speed of rotation thereof, and blocking means normally blocking operation of said escapement mechanism and releasable upon depression of a said key spindle.

3. A transmitter according to claim 1, and interlocking lug means actuatable upon completed depression of any said key spindle to lock said depressed key spindle in depressed position and to lock all other key spindles in undepressed position, said interlocking lug means being releasable by said master release means.

4. Keyboard code pulse transmitter for transmitting code signals comprising a keyboard provided with contacts and a rotary switch, one contact of the keyboard being connected to one contact stud of the rotary switch respectively, a rack, a spring, means for causing the depression of a key to bring about the closing of one or more contacts of the keyboard, means for causing the depression of said key to displace said rack, means for causing the displacement of said rack to wind up said spring, means for causing the further depression of said key to release said spring and means for causing the release of said spring to bring about the rotation of the rotary switch brush with a substantially constant speed through one revolution in a constant direction from a homing position.

HENRI LOUIS LESIGNE.

REFERENCES CITED

The following references are of record in the file of this patent:

UNITED STATES PATENTS

| Number | Name | Date |
|---|---|---|
| 1,164,737 | Mead | Dec. 21, 1915 |
| 1,689,294 | Potts | Oct. 30, 1928 |
| 1,844,449 | Stewart et al. | Feb. 9, 1932 |
| 1,969,978 | Hanel | Aug. 14, 1934 |
| 2,170,100 | Terjesen | Aug. 22, 1939 |
| 2,212,548 | Noxon | Aug. 27, 1940 |
| 2,255,201 | Wheelock | Sept. 9, 1941 |
| 2,284,322 | Kimball | May 26, 1942 |
| 2,345,137 | Long | Mar. 28, 1944 |
| 2,386,609 | Hubbard | Oct. 9, 1945 |